US012627162B2

(12) United States Patent
Xiao et al.

(10) Patent No.: US 12,627,162 B2
(45) Date of Patent: May 12, 2026

(54) PROTECTION CIRCUIT FOR SERIES-CONNECTED BATTERIES

(71) Applicant: Shenzhen Injoinic Technology Co., Ltd., Shenzhen (CN)

(72) Inventors: Chuan Xiao, Shenzhen (CN); Fengmin Xie, Shenzhen (CN)

(73) Assignee: Shenzhen Injoinic Technology Co., Ltd., Shenzhen (CN)

( * ) Notice: Subject to any disclaimer, the term of this patent is extended or adjusted under 35 U.S.C. 154(b) by 697 days.

(21) Appl. No.: 18/132,959

(22) Filed: Apr. 10, 2023

(65) Prior Publication Data

US 2023/0261485 A1      Aug. 17, 2023

Related U.S. Application Data

(63) Continuation of application No. PCT/CN2021/073572, filed on Jan. 25, 2021.

(30) Foreign Application Priority Data

Oct. 10, 2020   (CN) .......................... 202011078214.2
Oct. 10, 2020   (CN) .......................... 202022245921.8

(51) Int. Cl.
| | |
|---|---|
| *H02J 7/50* | (2026.01) |
| *H02J 7/61* | (2026.01) |
| *H02J 7/62* | (2026.01) |
| *H02J 7/63* | (2026.01) |
| *H02J 7/64* | (2026.01) |
| *H02J 7/65* | (2026.01) |

(52) U.S. Cl.
CPC ................ *H02J 7/575* (2026.01); *H02J 7/61* (2026.01); *H02J 7/62* (2026.01); *H02J 7/63* (2026.01); *H02J 7/64* (2026.01); *H02J 7/65* (2026.01)

(58) Field of Classification Search
CPC .......... H02J 7/575; H02J 7/61–65; H02J 7/00; H02J 7/663
See application file for complete search history.

(56) References Cited

U.S. PATENT DOCUMENTS

| | | | | |
|---|---|---|---|---|
| 2010/0268492 A1* | 10/2010 | Matsuura | ............. | G01R 31/396 |
| | | | | 324/72 |
| 2017/0025867 A1* | 1/2017 | Wang | ........................ | H02J 7/56 |

* cited by examiner

*Primary Examiner* — David V Henze
(74) *Attorney, Agent, or Firm* — IPro, PLLC; Na Xu

(57) ABSTRACT

A protection circuit for series-connected batteries is provided, including: a plurality of battery modules connected in series between an anode and a cathode of a battery pack, wherein each of the plurality of battery modules includes a single battery, a protection switch, and a single-battery protection module, wherein each single battery is connected in series with the corresponding protection switch, wherein each single-battery protection module is configured to generate an off signal and protect the corresponding battery module in response to the off signal; an off-signal level-shifting module, which transmits an off signal of one of the plurality of battery modules to the other battery modules; a transient-voltage suppression module, connected between the anode and cathode of the battery pack, for voltage deburring and decreasing a change rate of a total voltage across the anode and cathode of the battery pack.

13 Claims, 6 Drawing Sheets

PROTECTION CIRCUIT FOR SERIES-CONNECTED BATTERIES

CROSS REFERENCE TO RELATED APPLICATIONS

The present application is a Continuation application of PCT application No. PCT/CN2021/073572 filed on Jan. 25, 2021, which claims the benefit of CN202011078214.2 filed on Oct. 10, 2020, and CN202022245921.8 filed on Oct. 10, 2020. All the above are hereby incorporated by reference in their entirety for all purposes.

FIELD OF THE INVENTION

The present disclosure generally relates to integrated circuit design, and in particular to a protection circuit for series-connected batteries.

BACKGROUND OF THE INVENTION

With vigorous implementation of energy-saving policies and emission reduction plans, and promotion of green travel, new energy vehicles have become the new frontier, and researchers worldwide are committed to research and development of cleaner vehicles more than ever, which greatly accelerates the development of lithium-ion power batteries. However, the inherent fragility of lithium-ion batteries poses risks to lithium-ion-battery vehicles, and therefore how to achieve better protection of lithium-ion batteries has become a goal of some engineers. But, to date, there has been little progress in protection for series-connected lithium-ion batteries or battery packs, and there is no substantial breakthrough in striking a balance between cost and protection efficiency.

SUMMARY OF THE INVENTION

In view of the above-mentioned shortcomings of the prior art, the present disclosure provides a protection circuit for series-connected batteries that strikes a balance between cost and protection efficiency.

The present disclosure provides a switch current source circuit, which at least includes:

a plurality of battery modules connected in series between an anode and a cathode of a battery pack, an off-signal level-shifting module, and a transient-voltage suppression module;

wherein each battery module comprises a single battery, a protection switch, and a single-battery protection module; each single battery is connected in series with the corresponding protection switch, each single-battery protection module is configured to generate an off signal based on a detection signal of the corresponding battery module or an output signal of the off-signal level-shifting module, and to control the protection switch based on the off signal to protect the battery module;

wherein the off-signal level-shifting module is connected to each of the plurality of battery modules, and is configured to transmit an off signal of one of the plurality of battery modules to other battery modules of the plurality of battery modules, to cause the other battery modules to enter a protection state;

wherein the transient-voltage suppression module is connected between the anode and cathode of the battery pack, for voltage deburring and decreasing a change rate of a total voltage across the anode and cathode of the battery pack.

Optionally, each single-battery protection module comprises a detection unit, and a logic processing unit, wherein each detection unit is configured to receive a detection signal and generate a corresponding protection signal, wherein each logic processing unit is connected to outputs of the corresponding detection unit and outputs of the off-signal level-shifting module, wherein each logic processing unit generates an off signal for the corresponding battery module, in response to the protection signal generated by the corresponding detection unit, or in response to off signals from other battery modules of the protection circuit.

Optionally, each detection unit comprises one or more of an under-voltage detection subunit, an over-voltage detection subunit, an over-temperature detection subunit, an over-current-discharging detection subunit, and an over-current-charging detection subunit.

Optionally, each battery module further comprises a bypass diode connected in parallel with an intermediate structure consisting of the corresponding single battery and protection switch; wherein an anode of each bypass diode is connected to the corresponding protection switch, wherein a cathode of the bypass diode is connected to the corresponding single battery.

Optionally, each battery module further comprises a voltage divider resistor connected in parallel with the corresponding protection switch.

Optionally, each battery module further comprises a bypass capacitor, which is connected in parallel with the corresponding protection switch, or in parallel with an intermediate structure consisting of the corresponding single battery and protection switch.

Optionally, the off-signal level-shifting module comprises a first resistor, a second resistor, a Darlington current amplifier, and transistors, wherein each of the transistors corresponds to one of the plurality of battery modules, wherein each transistor has a first end connected to an anode of the single battery of the corresponding battery module, a second end connected to the cathode of the battery pack via the first resistor, and a control end connected to the off signal generated by the corresponding single-battery protection module, wherein a first end of the Darlington current amplifier is connected to each of the plurality of battery modules and further to the anode of the battery pack via the second resistor, wherein a second end of the Darlington current amplifier is connected to the cathode of the battery pack, wherein a control end of the Darlington current amplifier is connected to the second end of each of the transistors, wherein each of the transistor is a PNP triode, or a PMOS transistor.

Optionally, the off-signal level-shifting module further comprises voltage-limiting units, each of which corresponds to one of the plurality of battery modules, wherein each of the voltage-limiting units comprises a current-limiting resistor and a Zener diode, wherein each current-limiting resistor has a first end connected to the first end of the Darlington current amplifier, and a second end connected to the corresponding battery module, wherein each Zener diode has a cathode connected to the second end of the corresponding current-limiting resistor, and an anode connected to a cathode of the single battery in the corresponding battery module.

Optionally, the first end of each transistor is connected to the anode of the single battery of the corresponding battery module via a resistor, and the control end of each transistor is connected to the corresponding off signal via a resistor.

Optionally, the Darlington current amplifier is replaced by an NPN triode or an NMOS transistor.

Optionally, wherein the transient-voltage suppression module comprises one or more of a capacitor, a series-parallel structure comprising a capacitor and a resistor, and a series-parallel structure comprising a capacitor and an inductor.

Optionally, the protection switch in each battery module is replaced by a discharge switch and a charge switch connected in series; wherein the off-signal level-shifting module is replaced by a discharge off-signal level-shifting module and a charge off-signal level-shifting module connected in parallel, and the discharge off-signal level-shifting module receives an off signal generated by the discharge switch in any of the plurality of battery modules and transmits it to the other battery modules of the plurality of battery modules, wherein the charge off-signal level-shifting module receives an off signal generated by the charge switch in any one of the plurality of battery modules and transmits it to the other battery modules of the plurality of battery modules.

Optionally, each protection switch, each discharge switch and each charge switch respectively comprise a plurality of switches connected in parallel.

As described above, the protection circuit for series-connected batteries of the present disclosure has the following beneficial effects:

It adopts lower withstand voltage charging and discharge switch devices to achieve protection of higher voltage series batteries, which can protect both the series battery as a whole and each series battery, and at the same time, solves the problem that short circuit between series batteries cannot be protected, with high safety performance. In addition, the protection circuit for series-connected batteries of the present disclosure uses low withstand voltage switching devices, and therefore the manufacturing cost is greatly reduced.

REFERENCE NUMERALS

11~1$n$ First To Nth Battery Modules
111~1$n$1 First To Nth Single-Battery Protection Modules
111$a$ Detection Unit
111$b$ Logic Processing Unit
2 Off-Signal Level-Shifting Module
2$a$ Discharge Off-Signal Level-Shifting Module
2$b$ Charge Off-Signal Level-Shifting Module

21 Darlington Current Amplifier
221~22$n$ First To Nth Voltage Limiting Units
3 Transient-Voltage Suppression Module

DETAILED DESCRIPTION

The present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Refer to FIG. 1 to FIG. 6. It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the components' layout may also be more complicated.

Figure 1:
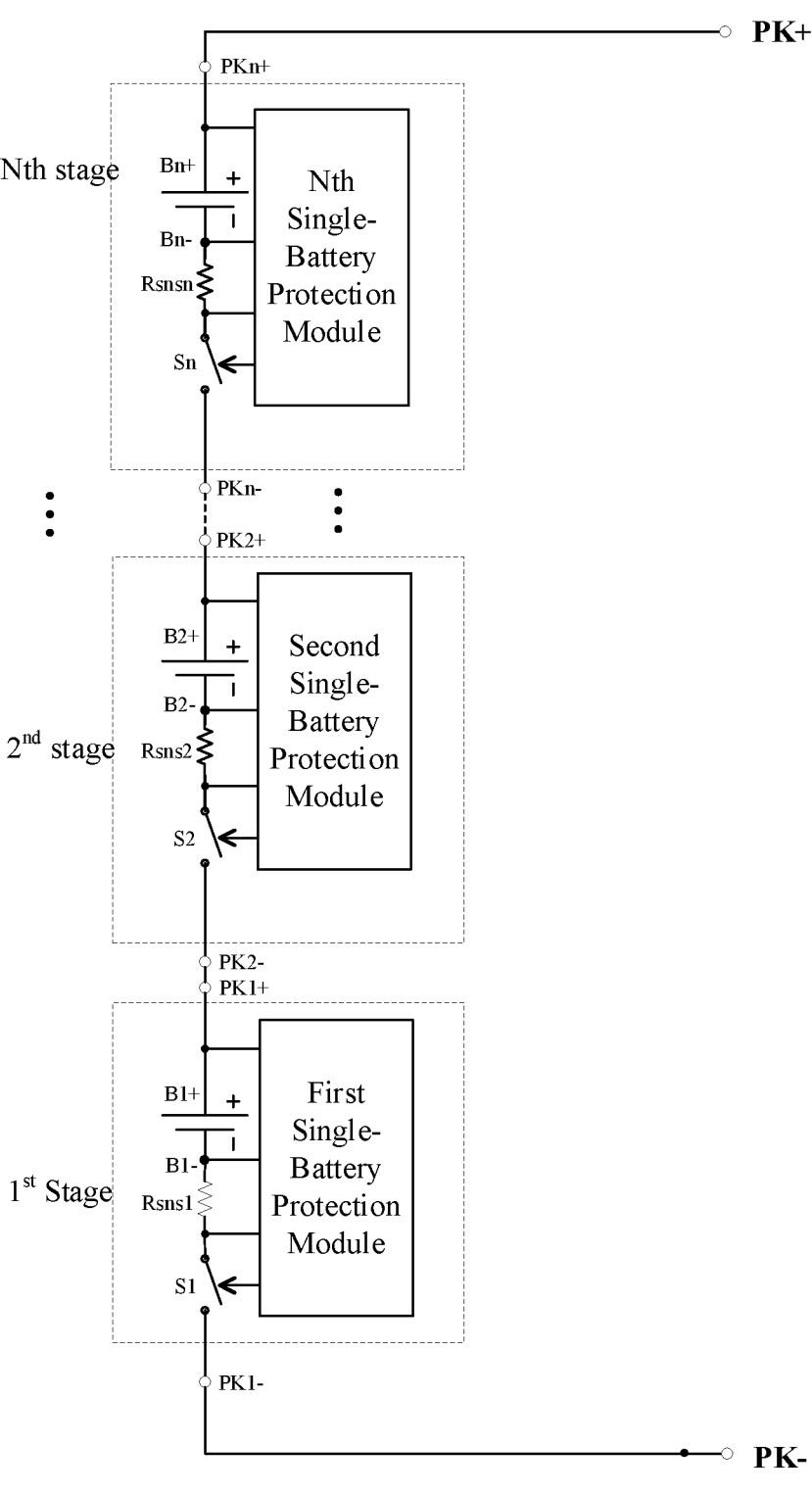
FIG. 1 shows a schematic circuit structure diagram of a first scheme for protecting series-connected batteries.

FIG. 1 shows a first protection scheme for series-connected batteries, which includes n stages of series-connected batteries, each battery is connected in series with a protection switch (S1, S2 . . . Sn), and each battery itself includes a corresponding single-battery protection module with a protection switch. If a certain battery among the series-connected batteries is turned off, the voltage across the corresponding protection switch will be subjected to all voltage changes of the total input and output of the series-connected batteries. Therefore, to ensure safety, each protection switch used must be a device with a high breakdown voltage so that it is able to withstand the total input and output voltages of the series-connected batteries. Assume that a battery pack with thirteen ternary-lithium batteries connected in series has a normal output voltage of 48V, once a short circuit occurs, one protection switch in the battery pack will first disconnect (due to the inevitable variability of built-in protection delay time of the chip, the protection switches in the series will not simultaneously disconnect when the short circuit occurs, and it is more likely that one of the protection switches will disconnect earlier). Since the voltages at two ends of a battery remains unchanged, the node of the disconnected protection switch connected to the cathode of a first adjacent battery will be negatively charged (the voltage of the cathode of this battery PK– is defined as the ground level), while the node of the disconnected protection switch connected to the anode of a second adjacent battery will become positively charged, and the voltage difference across the disconnected protection switch will be equal to the output voltage of the entire battery pack, that is, 48V. Therefore, each protection switch in the series needs to withstand more than 48V, such as 80V or even 100V. Moreover, since more than ten or even dozens of switches are to be used in series, they each need to have a small resistance (even less than 10 milliohms) to ensure that the total resistance of the switches is not too large. Such requirements will incur a prohibitively high manufacturing cost. In addition, to achieve accurate current protection (with an accuracy of +/−10%) for each battery, it is also necessary to introduce high-precision high-power current sampling resistors (Rsns1, Rsns2 . . . Rsnsn) to each of the series-connected batteries; specifically, for the 400V/500 A scenario, each battery needs to be connected in parallel with dozens of high-precision high-power current sampling resistors, and the same applies to a total of one hundred batteries, which means thousands of high-precision high-power current sampling resistors are required. The cost of a single high-precision high-power current sampling resistor is around 0.5 yuan, and the total cost of thousands of high-precision high-power current sampling resistors is as high as several thousand yuan.

Figure 2:
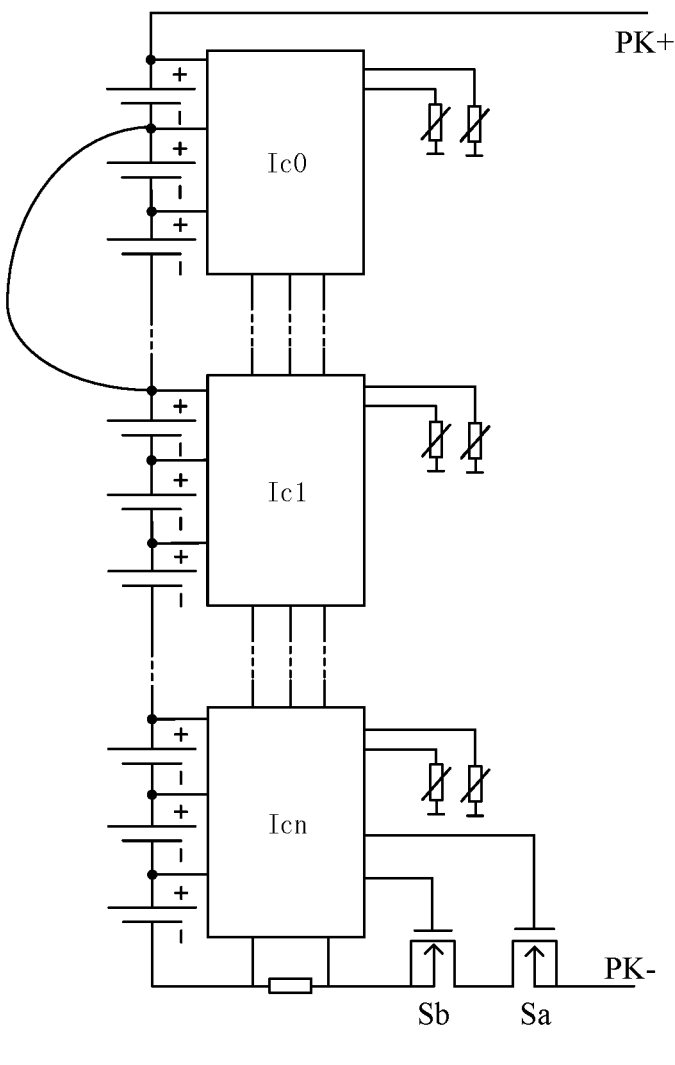
FIG. 2 shows a schematic circuit structure diagram of a second scheme for protecting series-connected batteries.

In order to avoid the high cost caused by having a high-voltage low-impedance switching device for each battery, in one embodiment, each of the batteries connected in series no longer has its own switching device and own protection module, and thermistors (e.g., in the case of Tesla) are used for each of the batteries connected in series for rough protection; or there is simply no single-battery protection at all, only combined protection. FIG. 2 shows a second protection scheme for series-connected batteries, which introduces a charge-switch transistor Sa and a discharge-switch transistor Sb at the cathode PK– of the battery pack, and the discharge-switch transistor Sb and charge-switch transistor Sa are shut down for protection when abnormal events occur, and when a battery is overcharged or under discharged, a protection signal is relayed to a chip directly connected to the charge-switch transistor Sa and discharge-switch transistor Sb through chips in adjacent stages, and then the chip performs the shutdown. The above scheme gives up single-battery protection and avoids using a large number of high-voltage switching transistors, which greatly reduces the manufacturing cost. However, this scheme does not have any protection capability when a short-circuit high-current discharge occurs between several batteries connected in series (for example, when an accidental impact causes a metal conductor to short-circuit an anode and a cathode of one or more batteries connected in series, as shown in FIG. 2), in which case even turning off the charge-switch transistor Sa and the discharge-switch transistor Sb cannot stop the high-current discharge. In addition, this scheme is not compatible with series battery equalization circuits. Since each single battery is not provided with its own precise current protection, it is impossible to apply this scheme to equalization circuits with a current of 2.0 A or higher. Specifically, in any equalization circuit with a relatively higher current, each single battery needs its own precise over-current protection to avoid over-current or short-circuit related damages to the battery caused by potential failures of the equalization circuit. Also, potential abnormal short-circuit of connecting wires in the equalization circuit also requires each single battery to have its own precise over-current protection module. Existing series-connected batteries cannot be equalized in real time, which leads to frequent repairmen, and is a vulnerable point of the battery industry.

Comparing the above two schemes, it can be seen that the second scheme has inherent defects that are difficult to cure, but is relatively cheap; the first scheme is able to provide comprehension protection, but its usage of low-impedance high-voltage charge/discharge switching devices makes it costly.

Embodiment 1

Figure 3:
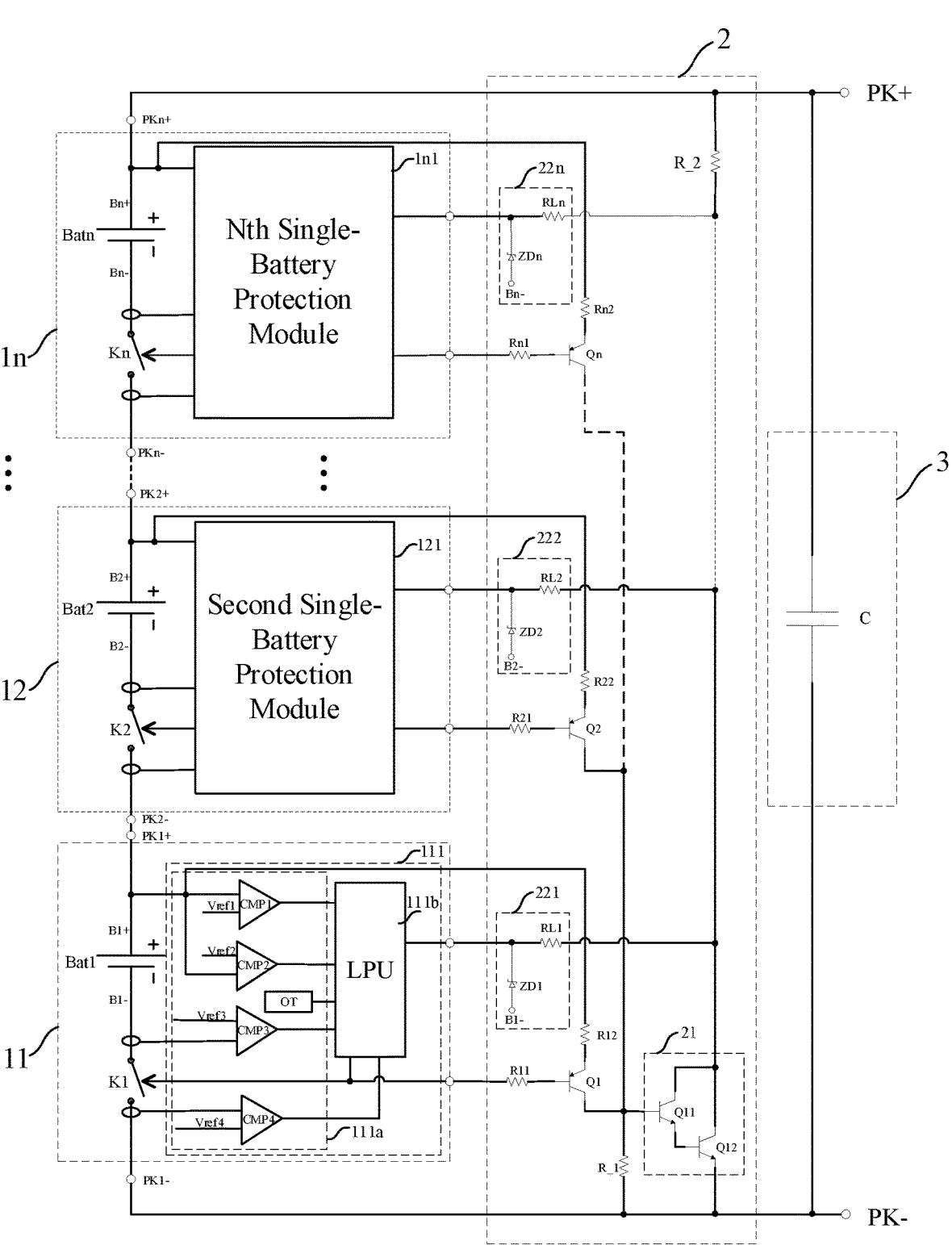
FIG. 3 shows a schematic structural diagram of a protection circuit for series-connected batteries according to one embodiment of the present disclosure.

As shown in FIG. 3, Embodiment 1 provides a protection circuit for series-connected batteries, including:

a plurality of battery modules, an off-signal level-shifting module 2, and a transient-voltage suppression module 3. Single batteries of the plurality of battery modules constitute a battery pack.

FIG. 3 shows that the plurality of battery modules is connected in series between an anode PK+ and a cathode PK– of the battery pack.

Specifically, as an example, there are n cascaded battery modules (n is a natural number greater than or equal to 2), which includes a first battery module 11, a second battery module 12, . . . a nth battery module 1$n$, which are sequentially connected in series. The first battery module 11 includes a first single battery Bat1, a first protection switch K1 and a first single-battery protection module 111.

More specifically, the first single battery Bat1 is connected in series with the first protection switch K1. By way of example, an anode B1+ of the first single battery Bat1 serves as an anode PK1+ of the first battery module 11, a first end of the first protection switch K1 is connected to a cathode B1– of the first single battery Bat1, and a second end of the first protection switch K1 serves as a cathode PK1– of the first battery module 11 and is connected to the cathode PK– of the battery pack.

More specifically, the first single-battery protection module 111 generates a first off signal based on detection signals of the first battery module 11 or an output signal of the off-signal level-shifting module 2, and controls the first protection switch K1 to disconnect or connect based on the first off signal to protect the first battery module 11. As an example, the first single-battery protection module 111 includes a detection unit 111$a$ and a logic processing unit 111$b$ (labeled "LPU" in the figures). The detection unit 111$a$ receives detection signals and generates corresponding protection signals, the detection unit 111$a$ includes, but is not limited to, one or more of an under-voltage detection subunit CMP1, an over-voltage detection subunit CMP2, an over-temperature detection subunit OT, an over-current-discharging detection subunit CMP3, and an over-current-charging detection subunit CMP4. As an example, the under-voltage detection subunit CMP1 is connected to the anode B1+ of the first single battery Bat1, compares an anode voltage of the first single battery Bat1 with a first reference voltage Vref1 to determine whether the first single battery Bat1 is in an under-voltage state, and, if so, outputs a corresponding under-voltage protection signal; the over-voltage detection subunit CMP2 is connected to the anode B1+ of the first single battery Bat1, compares the anode voltage of the first single battery Bat1 with a second reference voltage Vref2 to determine whether the first single battery Bat1 is in an over-voltage state, and, if so, outputs a corresponding over-voltage protection signal; the over-temperature detection subunit OT determines whether the first single battery Bat1 is in an over-temperature state via an internal temperature detection device, and, if so, outputs a corresponding over-temperature protection signal; the over-current-discharging detection subunit CMP3 is connected to the cathode B1– of the first single battery Bat1, transforms a cathode current of the first single battery Bat1 into a first induced voltage, compares the first induced current with a third reference voltage Vref3 to determine whether the first single battery Bat1 has an excessive discharging current, and, if so, outputs a corresponding over-current-discharging protection signal; the over-current-charging detection subunit CMP4 is connected to the second end of the first protection switch K1, converts a current at the second end of the first protection switch K1 into a second induced voltage, compares the second induced current with a fourth reference voltage Vref4 to determine whether the first single battery Bat1 has an excessive charging current, and, if so, outputs a corresponding over-current-charging protection signal. The logic processing unit 111$b$ is connected to the detection unit 111$a$ and to outputs of the off-signal level-shifting module 2 to generate the first off signal of the first battery module 11 based on the protection signals generated by the various detection subunits or off signals of other battery modules.

It should be noted that the number, type, and connections of the various detection subunits in the detection unit 111$a$ can be adjusted according to actual needs. A cathode PK2− of the second battery module 12 is connected to the anode PK1+ of the first battery module 11, and the second battery module 12 includes a second single battery Bat2, a second protection switch K2, and a second single-battery protection module 121. Similarly, a cathode PKn− of the nth battery module 1$n$ is connected to an anode of the (n−1)th battery module, and the anode PKn+ of the nth battery module 1$n$ is connected to the anode PK+ of the battery pack; the nth battery module 1$n$ includes an nth single battery Batn, an nth protection switch Kn, and an nth single-battery protection module 1$n$1. The above description takes the first battery module 11 as an example. Optionally, the components and structures of the other battery modules are the same as the first battery module 11.

As an example, the over-discharge current detection subunit CMP3 and the over-charge current detection subunit CMP4 are comparators and/or operational amplifiers.

As shown in FIG. 3, the off-signal level-shifting module 2 is connected to each of the plurality of battery modules, and is configured to transmit an off signal of one of the plurality of battery modules to other battery modules of the plurality of battery modules, to cause the other battery modules to enter a protection state.

Specifically, in one example, the off-signal level-shifting module 2 includes a first resistor R_1, a second resistor R_2, a Darlington current amplifier 21, and transistors (first transistor Q1, second transistor Q2, . . . , and nth transistor Qn), wherein each of the transistors corresponds to one of the plurality of battery modules. As an example, each of the transistors is a PNP triode. In practice, any transistor that conducts when its control end receives a low level can be used as one of the transistors herein, and such a transistor includes, not limited to, a triode and a MOS transistor. A collector of the first transistor Q1 is connected to the cathode PK− of the battery pack via the first resistor R_1, a base of the first transistor Q1 is connected to the first off signal, and the emitter of the first transistor Q1 is connected to the anode B1+ of the first single battery Bat1. Similarly, collectors of the second transistor Q1, . . . and the nth transistor Qn are connected via the first resistor R_1 to the cathode PK− of the battery pack, bases of the second transistor Q1, . . . , and the nth transistor Qn are respectively connected to the off signal of a corresponding battery module, and emitters of the second transistor Q1, . . . , and the nth transistor Qn are respectively connected to the anode of a corresponding single battery. A first end of the Darlington current amplifier 21 is connected to each of the plurality of battery modules and further to the anode PK+ of the battery pack via the second resistor R_2, wherein a second end of the Darlington current amplifier 21 is connected to the cathode PK− of the battery pack, wherein a control end of the Darlington current amplifier 21 is connected to a second end of each of the transistors. As an example, the Darlington current amplifier 21 includes a first NPN triode Q11 and a second NPN triode Q12; a collector of the first NPN triode Q11 is connected to a collector of the second NPN triode Q12 and serves as the first end of the Darlington current amplifier 21, a base of the first NPN triode Q11 serves as the control end of the Darlington current amplifier 21, an emitter of the first NPN triode Q11 is connected to a base of the second NPN triode Q12, and an emitter of the second NPN triode Q12 is connected to the cathode PK− of the battery pack.

Alternatively, the first end of each transistor is connected to the anode of the single battery of the corresponding battery module via a resistor, and the control end of each transistor is connected to the corresponding off signal via a resistor. As an example, the base of the first transistor Q1 is connected via a resistor R11 to the first off signal of the first battery module 11, and the emitter of the first transistor Q1 is connected via a resistor R12 to the anode B1+ of the first single battery Bat1; the base of the second transistor Q2 is connected via a resistor R21 to the off signal of the second battery module 12, and the emitter of the second transistor Q2 is connected via a resistor R22 to an anode B2+ of the second single battery Bat2; the base of the nth transistor Qn is connected via a resistor Rn1 to the off signal of the nth battery module 1$n$, and the emitter of the nth transistor Qn is connected via a resistor Rn2 to an anode Bn+ of the nth single battery Batn.

Alternatively, the off-signal level-shifting module 2 further comprises voltage limiting units, each of which corresponds to one of the plurality of battery modules, and the voltage limiting units includes a first voltage limiting unit 221, a second voltage limiting unit 222, . . . , and a nth voltage limiting unit 22$n$. The first voltage limiting unit 221 includes a first current limiting resistor RL1 and a first Zener diode ZD1, a first end of the first current limiting resistor RL1 is connected to the first end of the Darlington current amplifier 21 and a second end of the first current limiting resistor RL1 is connected to the logic processing unit 111$b$ of the first battery module 11; the first Zener diode ZD1 has a cathode connected to the second end of the first current limiting resistor RL1, and an anode connected to the cathode B1− of the first single battery Bat1; the second voltage limiting unit 222 includes a second current limiting resistor RL2 and a second Zener diode ZD2, and is connected between the second battery module 12 and the first end of the Darlington current amplifier 21; similarly, the nth voltage limiting unit 22$n$ includes an nth current limiting resistor RLn and an nth Zener diode ZDn, and is connected between the nth battery module 1$n$ and the first end of the Darlington current amplifier 21. The above description takes the first voltage limiting unit 221 as an example. Optionally, the components and structures of the other voltage limiting units are the same as the first voltage limiting unit 221.

Specifically, if an abnormality occurs in one of the series-connected batteries, the corresponding single-battery protection module outputs an off signal (e.g., a signal that changes from high level to low level) to turn off its own protection switch, meanwhile a base voltage of the corresponding transistor in the off-signal level-shifting module 2 is pulled down, the transistor turns on, and a current flows in from the emitter of the transistor and out through the collector the transistor to the first resistor R_1; when the voltage across the first resistor R_1 is higher than Vbe_Q11+ Vbe_Q12 (e.g., about 1.4V), the Darlington current amplifier 21 then turns on, pulling the voltage at the first end of Darlington current amplifier 21 (i.e., collectors of the first NPN triode Q11 and the second NPN triode Q12) down (e.g., down to 0.5V or lower), and forced-shutdown input pins of the other single-battery protection modules (i.e., ports through which the Darlington current amplifier 21 is connected to the various logic processing units) changes from a normal high level to a low level, which correspondingly generates an off signal for each of the other protection switches, thus protecting all the battery modules connected in series.

At the same time, in order to clamp the voltage output to each battery module by the Zdun off-signal level-shifting module 2 so that it is neither too high nor too low compared to the voltage of the corresponding single battery, current limiting resistors and Zener diodes (e.g., 5V Zener diodes) are used to achieve voltage limiting, with a maximum input voltage of the nth single battery Batn being VBn+5V (VBn being the voltage at the cathode of the nth single battery Batn) and a minimum input voltage thereof being VBn−0.7V, except for the first single battery Bat1 whose minimum input voltage is 0 V. Each current limiting resistor limits the current flowing through the corresponding Zener diode. Take a 400V battery for example, if an anomaly occurs and the voltage at the first end of the Darlington current amplifier 21 is pulled down to 0.5V or less, the voltage at the cathode of the nth single battery will be 396 V (with the output voltage of each single battery being 4.0 V) and the voltage difference across the nth current limiting resistor RLn in the nth voltage limiting unit 22n is 396V−0.7V=395.3 V (with the forward turn-on voltage of the Zener diode being 0.7V). Herein, the nth voltage limiting unit 22n refers to the voltage limiting unit of the battery module that is connected to the anode PK+ of the battery pack (i.e., the "last" battery module as shown in FIG. 3), and the same applies to other components of the nth battery module. To prevent the single batteries from discharging too much current during an abnormal shutdown, the resistance value of the nth current limiting resistor RLn should be large enough, which is 10 megohms in one example. When the nth current limiting resistor RLn has a resistance value of 10 megohms, the current flow through it is 395.3V/10 megohms=39.5 μA. That is, during an abnormal shutdown, a self-discharging current of the nth single battery is 39.5 μA.

As an example, the off-signal level-shifting module 2 is composed of low-cost devices such as triodes, resistors, and Zener diodes, which greatly reduces the overall cost.

As shown in FIG. 3, the transient-voltage suppression module 3 is connected between the anode PK+ of the battery pack and the cathode PK− of the battery pack for voltage deburring and decreasing a change rate of the total voltage between the anode PK+ and cathode PK− of the battery pack.

Specifically, in practice, all protection switches will need to be disconnected and there are delays in between, and there is also a delay caused by the off-signal level-shifting module 2, which is in the order of hundreds of nanoseconds or even microseconds. The transient-voltage suppression module 3 can provide a stable total voltage between the anode PK+ of the battery pack and the cathode PK− of the battery pack, preventing a large current (e.g. 200 A) during delays and thereby preventing a huge voltage difference across each of the disconnected protection switches, assisting in smoothing changes of the voltage across each of the disconnected protection switches; and during the time period starting from the first protection switch being disconnected to the last protection switch being disconnected, the voltage rise of the transient-voltage suppression module 3 is less than the difference between the breakdown voltage of each switch and the output voltage of each single battery. The transient-voltage suppression module 3 enlarges the time window within which all the protection switches connected in series between the anode PK+ of the battery pack and the cathode PK− of the battery pack can be safely disconnected, and provides a stable voltage environment for all the components sharing the voltage between the anode PK+ and the cathode PK− of the battery pack.

Specifically, as an example, the transient-voltage suppression module 3 includes a capacitor C, one end of the capacitor C is connected to the anode PK+ of the battery pack, and the other end of the capacitor C is connected to the cathode PK− of the battery pack. In practice, the transient-voltage suppression module 3 includes, but is not limited to, one or more of a capacitor, a series-parallel structure including a capacitor and a resistor, and a series-parallel structure including a capacitor and an inductor. Any circuit structure capable of voltage deburring and decreasing a change rate of the total voltage between the anode PK+ and cathode PK− of the battery pack can be used as the transient-voltage suppression module 3.

The protection circuit for series-connected batteries operates as follows:

When charging, if an abnormality is detected in a particular single battery, the single-battery protection module corresponding to that single battery disconnects the protection switch of that single battery, at the same time transmits an off signal to other single batteries in the battery pack via the off-signal level-shifting module 2, and thereby disconnects the protection switches of all the other single batteries. At this time, all the protection switches of the series-connected batteries are disconnected, and under the action of the transient-voltage suppression module 3, the total input charging voltage of the series-connected batteries will not change abruptly, and is distributed among the series-connected batteries and their corresponding protection switches, which are disconnected. Due to the voltage distribution, it is no longer required that each of the protection switches has a high breakdown voltage, and therefore switches with a lower breakdown voltage can be used. If the single batteries have properties identical with each other, such as output voltage and internal resistance, and the protection switches also have identical properties, the total input charging voltage will be equally distributed among all the series-connected single batteries and their protection switches.

When discharging, if an abnormality is detected in a particular single battery, the single-battery protection module corresponding to that single battery disconnects the protection switch of that single battery, at the same time transmits an off signal to other single batteries in the battery pack via the off-signal level-shifting module 2, and thereby disconnects the protection switches of all the other single batteries. At this time, all the protection switches of the series-connected batteries are disconnected, and under the action of the transient-voltage suppression module 3, the total output discharging voltage of the series-connected batteries will not change abruptly, and is distributed among the series-connected batteries and their corresponding protection switches, until the total output discharging voltage of the series-connected batteries decays to zero. Due to the voltage distribution, it is no longer required that each of the protection switches has a high breakdown voltage, and therefore switches with a lower breakdown voltage can be used. If the single batteries have properties identical with each other, such as output voltage and internal resistance, and the protection switches also have identical properties, the total output discharging voltage will be equally distributed among all the series-connected single batteries and their protection switches.

Embodiment 2

Figure 4:
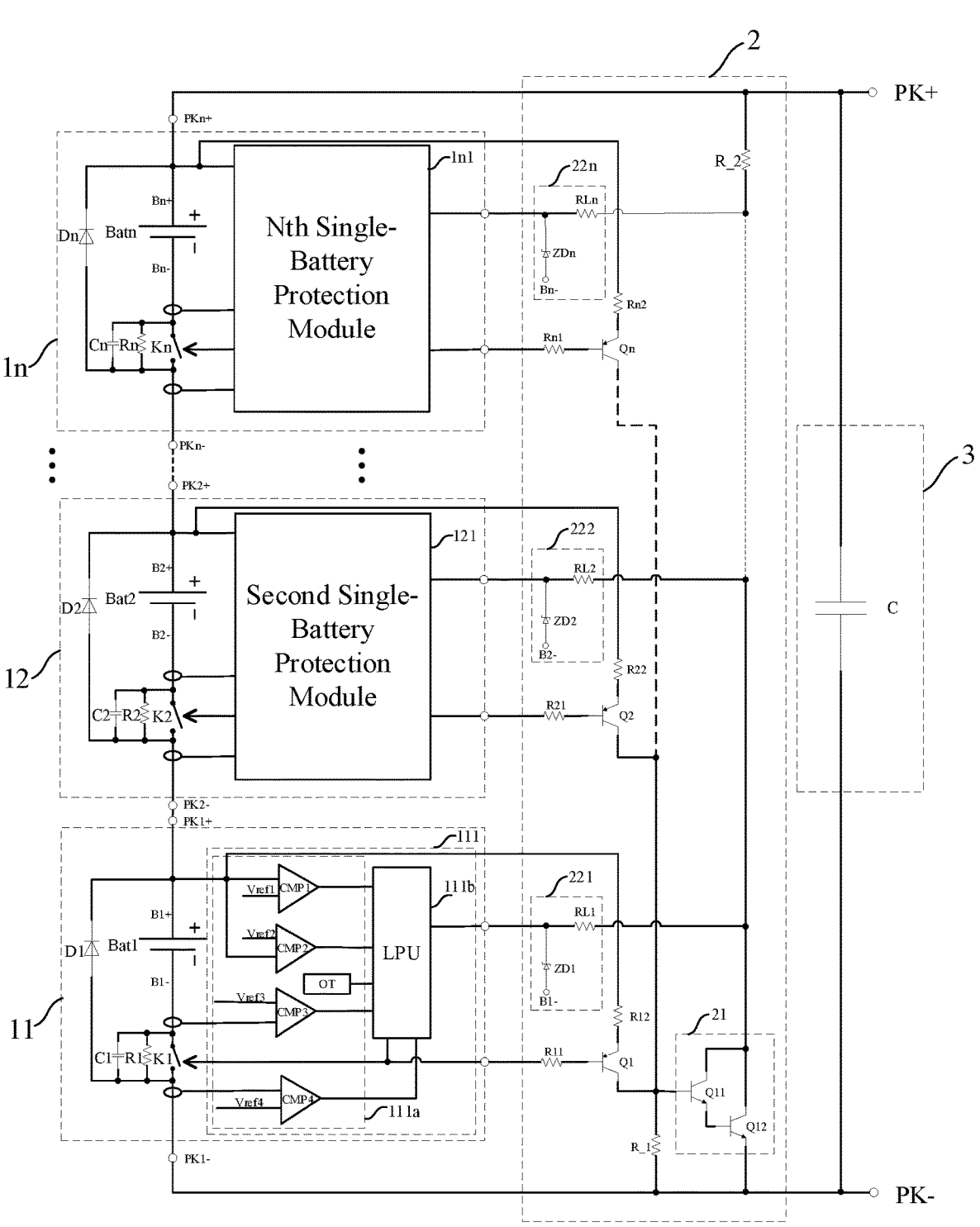
FIG. 4 shows a schematic structural diagram of a protection circuit for series-connected batteries according to one embodiment of the present disclosure.

As shown in FIG. 4, Embodiment 2 provides a protection circuit for series-connected batteries, which differs from Embodiment 1 in that each battery module also includes a bypass diode, a voltage divider resistor, and a bypass capacitor.

As an example, each battery module includes a bypass diode connected in parallel with an intermediate structure consisting of the corresponding single battery and protection switch, to enhance safety redundancy in case of instantaneous current bursts. Specifically, as shown in FIG. 4, a first bypass diode D1 is connected in parallel with an intermediate structure consisting of the first single battery Bat1 and the first protection switch K1, which are connected in series, an anode of the first bypass diode D1 is connected to a second end of the first protection switch K1, and a cathode of the first bypass diode D1 is connected to the anode B1+ of the first single battery Bat1. Similarly, an anode of the second bypass diode D2 is connected to a second end of the second protection switch K2 (the second end of the second protection switch K2 serves as the cathode PK1− of the first battery module 11), and a cathode of the second bypass diode D2 is connected to the anode B2+ of the second single battery Bat2. And so on, an anode of the nth bypass diode Dn is connected to a second end of the nth protection switch Kn and a cathode of the nth bypass diode Dn is connected to the anode Bn+ of the nth single battery Batn.

Specifically, each bypass diode is used to achieve a renewed current discharge after the corresponding protection switch is disconnected, thereby reducing the breakdown voltage required of the protection switch for each battery. At the same time, single batteries without abnormalities may continue supplying power or have their protection switches disconnected. When discharging, if an abnormality is detected in a single battery, the single-battery protection module of that battery will disconnect the protection switch of that battery. At this time, due to the bypass diode connected in parallel with the Ken single battery and its corresponding protection switch, the discharge current will no longer pass through the turned-off single battery and disconnected protection switch, but through the bypass diode. Voltage changes with the protection switch will be less than the sum of the output voltage of the single battery and the forward turn-on voltage of the bypass diode (when suitable diodes are used, the aforementioned sum can be kept lower than 10V under low-cost conditions), which further lowers the breakdown voltage required of each protection switch. That is, by introducing a diode for each of the series-connected batteries, with two ends of the diode respectively connected the anodes of two adjacent single batteries, switching devices with a lower breakdown voltage can be used to control the discharge of the single batteries. In practice, the bypass diode shall be compatible with current magnitudes of the circuit.

Alternatively, each battery module further includes a voltage divider resistor connected in parallel with the corresponding protection switch. Specifically, as shown in FIG. 4, a first voltage dividing resistor R1 is connected in parallel with the first protection switch K1, a second voltage dividing resistor R2 is connected in parallel with the second protection switch K2, and an nth voltage dividing resistor Rn is connected in parallel with the nth protection switch Kn.

Specifically, the voltage dividing resistor enable a more equalized distribution of the total input and output voltages of the series-connected batteries to the single batteries and their protection switches when all the protection switches are disconnected, to avoid generation of floating nodes, and resistance values of the voltage dividing resistors are determined by self-discharging currents of the single batteries.

Optionally, each battery module further includes a bypass capacitor for suppressing inductive electric potential caused by parasitic inductance formed by relatively long metal connecting wires between two adjacent single batteries or two battery packs, wherein the inductive electric potential, if not suppressed, will result in a large voltage difference across the corresponding protection switch when the latter is disconnected. As an example, each bypass capacitor is connected in parallel with the protection switch, as shown in FIG. 4, with a first bypass capacitor C1 connected in parallel with the first protection switch K1, a second bypass capacitor C2 connected in parallel with the second protection switch k2, and an nth bypass capacitor Cn connected in parallel with the nth protection switch Kn. As an example, each bypass capacitor is connected in parallel with an intermediate structure consisting of a single battery and a corresponding protection switch; i.e., each bypass capacitor is connected in parallel with a bypass diode. As an example, each bypass capacitor is a ceramic chip capacitor with a capacitance of 1 µF~10 µF. In practice, capacitors with different capacitances and/or of different types can be selected based on actual needs.

Embodiment 3

Figure 5:
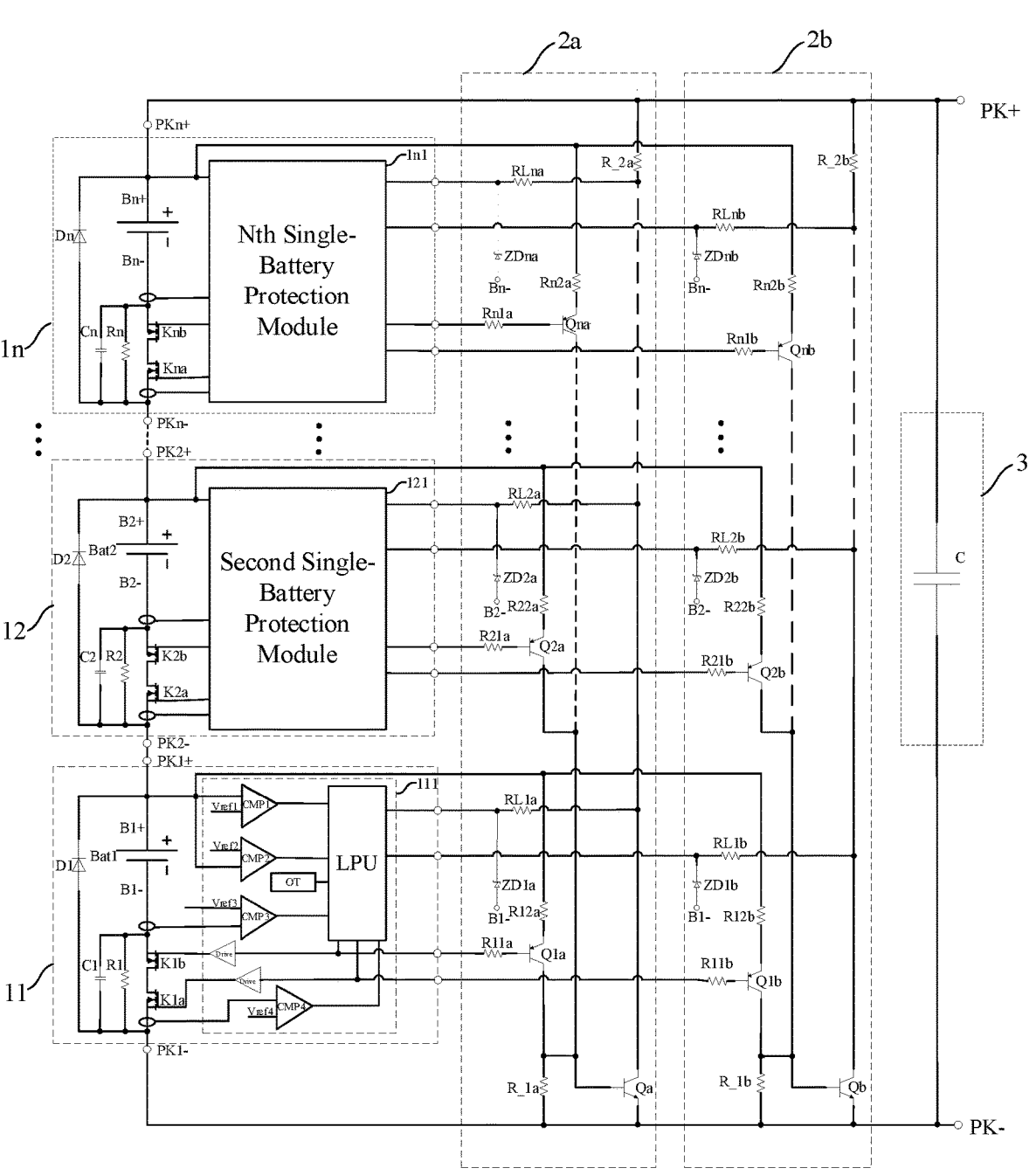
FIG. 5 shows a schematic structural diagram of a protection circuit for series-connected batteries according to one embodiment of the present disclosure.

As shown in FIG. 5, Embodiment 3 provides a protection circuit for series-connected batteries, which differs from Embodiment 2 in that each protection switch in Embodiment 2 is replaced by a discharge switch and a charge switch that are connected in series; correspondingly, the off-signal level-shifting module in Embodiment 2 is replaced by a discharge off-signal level-shifting module 2a configured to generate off signals for the discharge switches, and a charge off-signal level-shifting module 2b configured to generate off signals for the charge switches.

Specifically, a first charge switch K1a and a first discharge switch K1b in the first battery module 11, and the cathode B1− of the first single battery Bat1 are connected in series, and the positions of the first charge switch K1a and the first discharge switch K1b are interchangeable. A second charge switch K2a and a second discharge switch K2b replace the second protection switch K2 in the second battery module 12, and a nth charge switch Kna and a nth discharge switch Knb replace the nth protection switch Kn in the nth battery module 1n. Each off signal is transmitted to a control end of each switch via a drive stage (labeled "drive" in the figures).

Specifically, correspondingly, the off signal of each charge switch is transmitted to the charge off-signal level-shifting module 2b, and then the charge off-signal level-shifting module 2b transmits it to the other battery modules. The off signal of each discharge switch is transmitted to a discharge off-signal level-shifting module 2a and based on the discharge off-signal level-shifting module 2a is transmitted to the other battery modules Optionally, circuit structures of the discharge off-signal level-shifting module 2a and the charge off-signal level-shifting module 2b are the same as that of the off-signal level-shifting module 2, and therefore labels of the components of the discharge off-signal level-shifting module 2a and the charge off-signal level-shifting module 2b correspond to those of the off-signal level-shifting module 2, albeit distinguished by suffixes a, b).

Optionally, the Darlington current amplifier 21 is replaced by two NPN triodes, each of which corresponds to either the discharge off-signal level-shifting module 2a or the charge off-signal level-shifting module 2b, as shown in FIG. 5; an emitter of each NPN triode is connected to the cathode PK− of the battery pack, a base of each NPN triode is connected to the second end of each transistor in the corresponding off-signal level-shifting module 2a or 2b, a collector of each transistor is connected to each of the plurality of battery modules and connected to the anode PK+ of the battery pack via a corresponding second resistor R_2a or R_2b.

Embodiment 4

Figure 6:
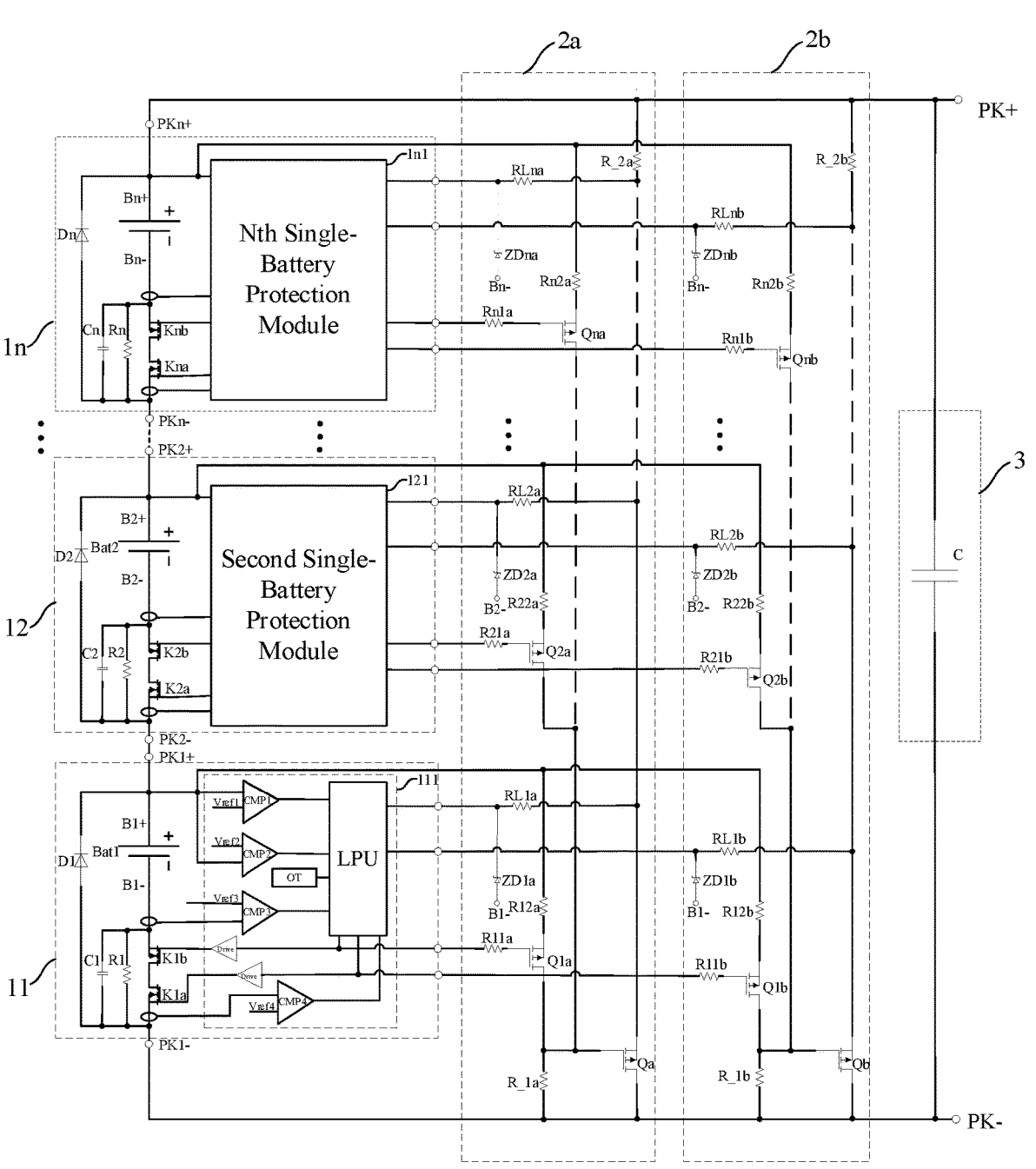
FIG. 6 shows a schematic structural diagram of a protection circuit for series-connected batteries according to one embodiment of the present disclosure.

As shown in FIG. 6, Embodiment 4 provides a protection circuit for series-connected batteries, which differs from Embodiment 3 in that the triodes are replaced with MOS transistors. Specifically, each PNP triode in Embodiment 3 is replaced with a PMOS transistor, and each NPN triode in Embodiment 3 is replaced with an NMOS transistor.

As an example, each protection switch, each discharge switch, and/or each charge switch respectively includes a plurality of switches connected in parallel, whose quantities may be configured according to currents that may flow through the switches.

If there are n identical components connected in series, the voltage across each component will be 1/n of the voltage of the whole series circuit. The present disclosure equips each single battery with the same single-battery protection module and protection switch, and when one single battery is in an abnormal state, while disconnecting the protection switch of that single battery, the corresponding off signal is transmitted to other single batteries via the turn-off-signal level-shifting module 2, and as a result, the protection switches of the other single batteries are immediately disconnected. At this time, all the protection switches are disconnected, and according to the voltage divider rule, the total voltage of n series-connected batteries will be equally distributed among n identical single batteries and their corresponding protection switches that are disconnected, and the voltage across each identical single cell is 1/n of the total voltage of the n series-connected batteries. For example, if one hundred ternary lithium-ion batteries connected in series have a combined output voltage of 370V to 420V, after all switches are disconnected, there will be one hundred identical units, and the voltage assigned to each single battery is about 420V/100=4.2V. In practice, the above 420V will generate an induced electric potential of 420V; that is, a total voltage of 420+420=840V will be generated, at which time, the voltage assigned to each single battery is about 840V/100=8.4V. Considering that the maximum voltage fluctuation of a single battery is usually from 0V to 4.5V, that the working voltage of each protection switch is 8.4V, and that more than 50% of safety redundancy should be included, the breakdown voltage of the protection switch of a single battery can be set to be about 13V, which is much smaller than that of the first scheme as described earlier in the disclosure. The above analysis shows that providing a charge switch and a discharge switch with a breakdown voltage of 13V to each single battery is sufficient to protect lithium-ion batteries connected in series with a total voltage up to 420V, and it is ensured that all protection switches can be disconnected at the same time. In practice, there is a time delay difference of hundreds of nanoseconds or even microseconds for the turn-off-signal level-shifting module 2 to disconnect each of the switches, and disconnecting switches when there is a large current flowing through the circuit will cause voltage burrs, which makes the protection less reliable.

In order to prevent the time delay difference from causing a large voltage difference across the protection switch of a particular single battery during high-current applications, a high-voltage large capacitor (e.g., the transient-voltage suppression module 3) is connected between the anode PK+ and the cathode PK− of the battery pack to suppress transient voltage changes brought by short-circuit currents as large as hundreds of amperes. The required capacitance value of the high-voltage large capacitor can be calculated as follows: assuming in an extreme scenario the charge/discharge current, or short-circuit current instantaneously increase from 1 A to 500 A, the time delay difference of the off-signal level-shifting module 2 is 2 µs, the breakdown voltage of the protection switch of each battery protection module is 13V, the output voltage of each single battery is 4.2V, and according to the formula $\Delta I * t = C * \Delta V$, the capacitance value of the high-voltage large capacitor needs to be $C = \Delta I * t / \Delta V = (500 A - 1 A) * 2 us / (13V - 4.2V) = 113.4$ µF. Considering fluctuations of the capacitance value caused by ambient temperature changes and the fact that the capacitance value will decay over a long period of time, the capacitance value finally chosen for the high-voltage large capacitor may be 220 µF, with a 100% redundancy. Of course, other devices can be used to suppress transient voltage changes, which should also fall within the scope of the present disclosure.

After connecting a 220 µF large capacitor in parallel with the battery pack and having one hundred identical switches each with a breakdown voltage of 13V and each corresponding to a single battery, protection for the series-connected batteries with a total output voltage of 400V can be realized.

In summary, the present disclosure provides a protection circuit for series-connected batteries, including a plurality of battery modules connected in series between an anode and a cathode of a battery pack, an off-signal level-shifting module, and a transient-voltage suppression module; wherein each battery module comprises a single battery, a protection switch, and a single-battery protection module; each single battery is connected in series with the corresponding protection switch, each single-battery protection module is configured to generate an off signal based on a detection signal of the corresponding battery module or an output signal of the off-signal level-shifting module, and to control the protection switch based on the off signal to protect the battery module; wherein the off-signal level-shifting module is connected to each of the plurality of battery modules, and is configured to transmit an off signal of one of the plurality of battery modules to other battery modules of the plurality of battery modules, to cause the other battery modules to enter a protection state; wherein the transient-voltage suppression module is connected between the anode and cathode of the battery pack, for voltage deburring and decreasing a change rate of a total voltage across the anode and cathode of the battery pack. The protection circuit of the present disclosure can reliably protect series-connected batteries with a higher total output voltage, while adopting switches with a lower breakdown voltage. Without substantially increasing the manufacturing cost, the protection circuit is able to protect not only the series-connected batteries (or series-connected battery packs) as a whole, but also each of the single batteries (or each battery pack when there are multiple battery packs), which is more effective than the existing schemes, and makes it significantly safer to use series-connected batteries (or series-connected battery packs). Also, the protection circuit of the present disclosure overcomes the problem in existing schemes that short circuits between single batteries of series-connected batteries cannot be protected against. Therefore, the present disclosure effectively overcomes various shortcomings in the existing technology and has high industrial utilization value.

The above-mentioned embodiments are used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A protection circuit for series-connected batteries, comprising:
    a plurality of battery modules connected in series between an anode and a cathode of a battery pack, an off-signal level-shifting module, and a transient-voltage suppression module;
    wherein each battery module comprises a single battery, a protection switch, and a single-battery protection module; each single battery is connected in series with the corresponding protection switch, each single-battery protection module is configured to generate an off signal based on a detection signal of the corresponding battery module or an output signal of the off-signal level-shifting module, and to control the protection switch based on the off signal to protect the battery module;
    wherein the off-signal level-shifting module is connected to each of the plurality of battery modules, and is configured to transmit an off signal of one of the plurality of battery modules to other battery modules of the plurality of battery modules, to cause the other battery modules to enter a protection state;
    wherein the transient-voltage suppression module is connected between the anode and cathode of the battery pack, for voltage deburring and decreasing a change rate of a total voltage across the anode and cathode of the battery pack.

2. The protection circuit for series-connected batteries according to claim 1, wherein each single-battery protection module comprises a detection unit, and a logic processing unit, wherein each detection unit is configured to receive a detection signal and generate a corresponding protection signal, wherein each logic processing unit is connected to outputs of the corresponding detection unit and outputs of the off-signal level-shifting module, wherein each logic processing unit generates an off signal for the corresponding battery module, in response to the protection signal generated by the corresponding detection unit, or in response to off signals from other battery modules of the protection circuit.

3. The protection circuit for series-connected batteries according to claim 2, wherein each detection unit comprises one or more of an under-voltage detection subunit, an over-voltage detection subunit, an over-temperature detection subunit, an over-current-discharging detection subunit, and an over-current-charging detection subunit.

4. The protection circuit for series-connected batteries according to claim 1, wherein each battery module further comprises a bypass diode connected in parallel with an intermediate structure consisting of the corresponding single battery and protection switch; wherein an anode of each bypass diode is connected to the corresponding protection switch, wherein a cathode of the bypass diode is connected to the corresponding single battery.

5. The protection circuit for series-connected batteries according to claim 1, wherein each battery module further comprises a voltage divider resistor connected in parallel with the corresponding protection switch.

6. The protection circuit for series-connected batteries according to claim 1, wherein each battery module further comprises a bypass capacitor, which is connected in parallel with the corresponding protection switch, or in parallel with an intermediate structure consisting of the corresponding single battery and protection switch.

7. The protection circuit for series-connected batteries according to claim 1, wherein the off-signal level-shifting module comprises a first resistor, a second resistor, a Darlington current amplifier, and transistors, wherein each of the transistors corresponds to one of the plurality of battery modules, wherein each transistor has a first end connected to an anode of the single battery of the corresponding battery module, a second end connected to the cathode of the battery pack via the first resistor, and a control end connected to the off signal generated by the corresponding single-battery protection module, wherein a first end of the Darlington current amplifier is connected to each of the plurality of battery modules and further to the anode of the battery pack via the second resistor, wherein a second end of the Darlington current amplifier is connected to the cathode of the battery pack, wherein a control end of the Darlington current amplifier is connected to the second end of each of the transistors, wherein each of the transistor is a PNP triode, or a PMOS transistor.

8. The protection circuit for series-connected batteries according to claim 7, wherein the off-signal level-shifting module further comprises voltage-limiting units, each of which corresponds to one of the plurality of battery modules, wherein each of the voltage-limiting units comprises a current-limiting resistor and a Zener diode, wherein each current-limiting resistor has a first end connected to the first end of the Darlington current amplifier, and a second end connected to the corresponding battery module, wherein each Zener diode has a cathode connected to the second end of the corresponding current-limiting resistor, and an anode connected to a cathode of the single battery in the corresponding battery module.

9. The protection circuit for series-connected batteries according to claim 7, wherein the first end of each transistor is connected to the anode of the single battery of the corresponding battery module via a resistor, and the control end of each transistor is connected to the corresponding off signal via a resistor.

10. The protection circuit for series-connected batteries according to claim 7, wherein the Darlington current amplifier is replaced by an NPN triode or an NMOS transistor.

11. The protection circuit for series-connected batteries according to claim 1, wherein the transient-voltage suppression module comprises one or more of a capacitor, a series-parallel structure comprising a capacitor and a resistor, and a series-parallel structure comprising a capacitor and an inductor.

12. The protection circuit for series-connected batteries according to claim 1, wherein the protection switch in each battery module is replaced by a discharge switch and a charge switch connected in series; wherein the off-signal level-shifting module is replaced by a discharge off-signal level-shifting module and a charge off-signal level-shifting module connected in parallel, and the discharge off-signal level-shifting module receives an off signal generated by the discharge switch in any of the plurality of battery modules and transmits it to the other battery modules of the plurality of battery modules, wherein the charge off-signal level-shifting module receives an off signal generated by the charge switch in any one of the plurality of battery modules and transmits it to the other battery modules of the plurality of battery modules.

13. The protection circuit for series-connected batteries according to claim 12, wherein each discharge switch and each charge switch respectively comprise a plurality of switches connected in parallel.

\* \* \* \* \*